(12) United States Patent
Anderson et al.

(10) Patent No.: US 6,287,401 B1
(45) Date of Patent: Sep. 11, 2001

(54) ALIGNMENT METHOD FOR SEMICONDUCTOR OPTICAL DEVICES UPON CARRIERS

(75) Inventors: Keith D. Anderson, Nepean; Richard P. Hughes, Kanata; Paul S. Ertl, Nepean, all of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/472,121

(22) Filed: Dec. 23, 1999

(51) Int. Cl.$^7$ .............................. B32B 31/28; H04B 10/04
(52) U.S. Cl. ...................... 156/64; 156/275.7; 156/297; 29/407.1; 29/464; 359/109; 359/183
(58) Field of Search .................... 156/64, 182, 275.5, 156/275.7, 297; 29/593, 407.01, 407.04, 407.05, 407.09, 407.1, 464, 466; 359/109, 180, 181, 183

(56) References Cited

U.S. PATENT DOCUMENTS 6,098,264 * 8/2000 Harrigan et al. ..................... 29/464

* cited by examiner

*Primary Examiner*—Michael W. Ball
*Assistant Examiner*—Michael A. Tolin

(57) ABSTRACT

To mount two semiconductor optical devices together such that a coupling face of one is aligned with and close to the coupling face of the other the devices are mounted on two different carriers. One of the carriers is flat and has a vertical edge and carries the optical device such that its coupling face is flush with the vertical edge. The other carrier is wedge-shaped and has a vertical edge and carries the other optical device such that its coupling face is flush with that vertical edge. A flat baseplate supports the flat carrier. The wedged carrier is supported on an inclined plane which may be formed on a separate wedge supported on the baseplate or which may be formed as an inclined surface portion on the baseplate. By sliding the flat carrier relative to the wedged carrier and sliding the wedged carrier up or down the inclined plane the coupling faces may be aligned. The application of liquid adhesive facilitates the sliding action and permits easy securing after alignment by curing the adhesive.

21 Claims, 3 Drawing Sheets

ALIGNMENT METHOD FOR SEMICONDUCTOR OPTICAL DEVICES UPON CARRIERS

FIELD OF THE INVENTION

This invention relates to optical alignment and, more particularly, to a method and apparatus for aligning semiconductor optical devices and fixing them in place.

BACKGROUND OF THE INVENTION

One of the most expensive components in any optical communications system is the optical transmitter module which may, for example, be comprised of a continuous wave (CW) distributed feedback (DFB) laser and an external Mach-Zender (MZ) intensity modulator, plus associated driving and stabilization electronics. For optical communication systems, it is natural to use optical components as much as possible if conditions permit. Traditionally, the alignment of semiconductor optical devices to one another has been carried out using conventional optics. The precise alignment of the DFB laser diode to an external MZ modulator may, for example, employ a pair of aspherical lenses with an optical isolator placed in between. An optical isolator is a device used to prevent light in a system from reflecting back to the source which could deteriorate its operation. As is well known, isolators are fairly complex devices and, as such, are generally quite expensive. Indeed, then, the precise optical alignment and packaging requirements for such transmitter modules will account for a considerable proportion of the cost for each unit.

In the past, discrete devices have been aligned with other discrete devices or with integrated devices by methods which include some form of active positioning. For example, some systems employ a feedback control loop to monitor light intensity as the devices are being aligned, the devices being fixed in place when the intensity is optimum. Alignment in such a manner has proven to be very difficult and time consuming. In addition to the high costs associated with the required complex components, such techniques necessarily demand very skilled and experienced operators.

While losses within an optical element can be reduced by appropriate component design, it is difficult to factor in the losses associated with coupling between optical elements. Connection losses are inherently variable and this forces the designer to consider the effect of both the maximum and minimum optical signal power levels on the system. Any new method of minimizing coupling losses between active or passive optical elements, minimizing the variability of such losses, or enhancing robustness and manufacturability, will be of tremendous value to the realization of cost-effective optical modules.

SUMMARY OF THE INVENTION

The present invention provides a more efficient and cost-effective means to align semiconductor optical devices to one another and fix them in place. In so doing, the complex, labour intensive, low-yield alignment process traditionally employed is eliminated.

The inventive concept is based on a chip-on-carrier model and delivers many of the benefits of a monolithically produced configuration. Specifically, a semiconductor optical device is mounted on a flat ceramic carrier while the device it is to be aligned with is mounted on a separate ceramic 'wedged' carrier. A ceramic wedge of similar size and proportions to the wedged carrier is also provided having been lapped to the same angle as the wedged carrier. The above device carriers are supported by a ceramic baseplate. A thin layer of liquid adhesive, applied to the top surface of both the baseplate and ceramic wedge, acts as a lubricant allowing for easy sliding of the carriers for subsequent alignment. By sliding the wedged carrier such that it slides up or down the incline of the ceramic wedge allows for adjustment in the vertical axis. The resulting configuration enables precise alignment of semiconductor optical devices with four degrees of freedom. Accordingly, the devices can be align-butted to sub-micron tolerances. Once alignment is achieved, the devices can be fixed in place by exposing the assembly to ultraviolet light or heat, depending on the adhesive used.

The invention results in approximately a ninety per cent reduction in alignment time over previous methods enabling a higher volume throughput per station. Advantageously, relatively little device development is needed since suitable independent components already exist. Furthermore, elimination of the optics presently used to couple light between respective semiconductor optical devices will make manufacture of modules more manageable and cheaper. Without the expensive optical components normally required, a lower capital value alignment station can also be realized.

Other aspects and features of the present invention will become apparent to those ordinarily skilled in the art upon review of the following description of specific embodiments of the invention in conjunction with the accompanying drawings.

DESCRIPTION OF THE PREFERRED EMBODIMENTS

Figure 1:
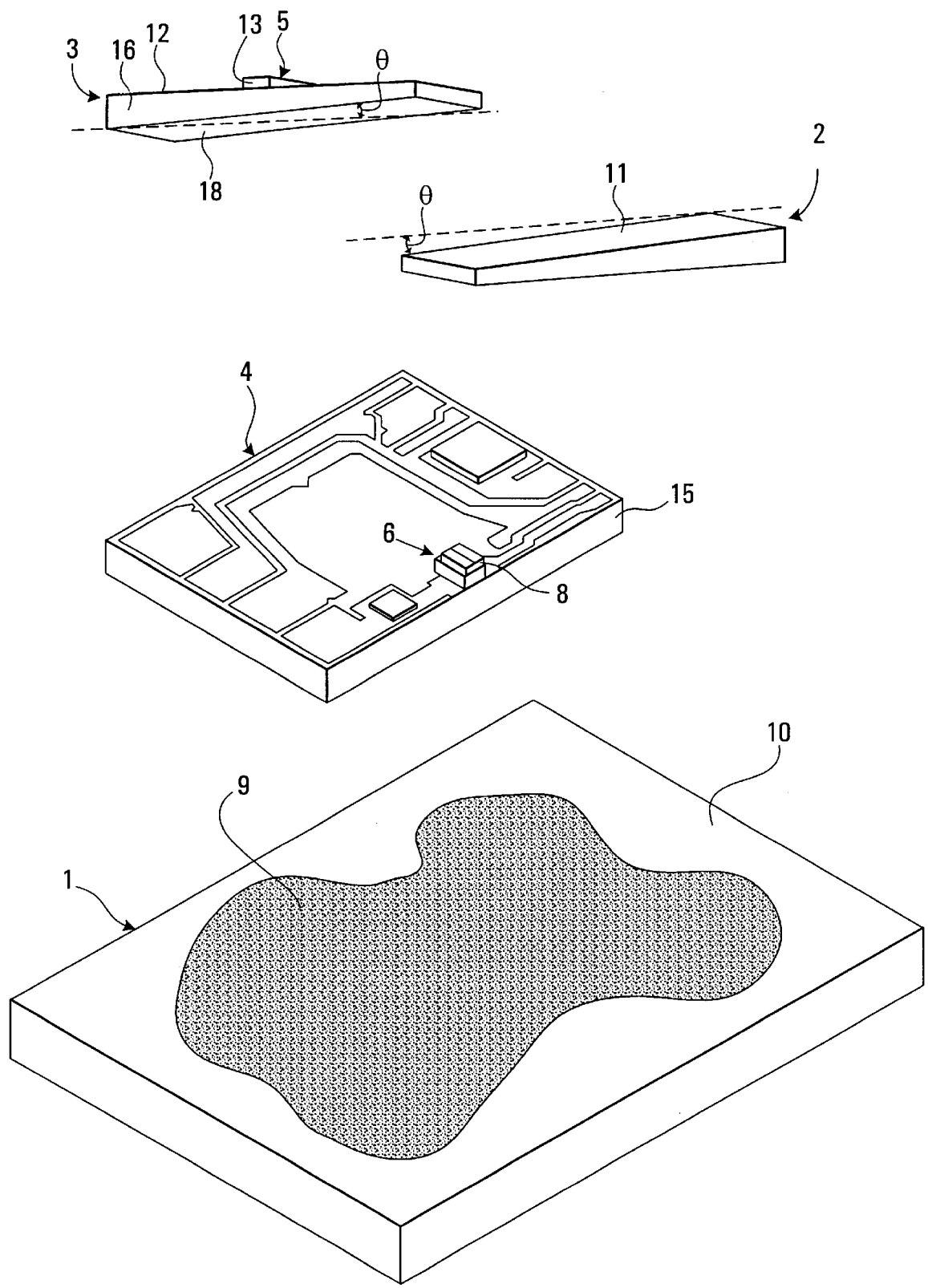
FIG. 1 is an exploded isometric view of the individual components comprising an optical alignment assembly according to the invention.

Referring to FIG. 1, four main components are used to mount an MZ modulator 5 in alignment with a laser diode 6. The components are a flat rectangular ceramic baseplate 1, a ceramic wedge 2, a ceramic wedged carrier 3 and a flat rectangular ceramic carrier 4.

The laser diode 6 is rectangular and very much smaller than carrier 4 on which it is mounted. More particularly, the laser diode 6 is mounted on an upper surface of the carrier 4 at a location approximately half-way along an edge 15 of the carrier 4 with an output face 8 of the laser diode substantially flush with the edge 15. The manner of mounting the laser diode 6 on the carrier 4 is by die bonding, typically with an intervening heat sink (not shown) made of diamond, using high temperature solders. The mounting method is conventional and forms no part of the invention. The upper surface of the carrier 4 may be provided with other electro-optic components and interconnections which together with laser diode 6 form an electro-optic circuit. These other components and interconnections form no part of the present invention and will not be discussed further.

Figure 2:
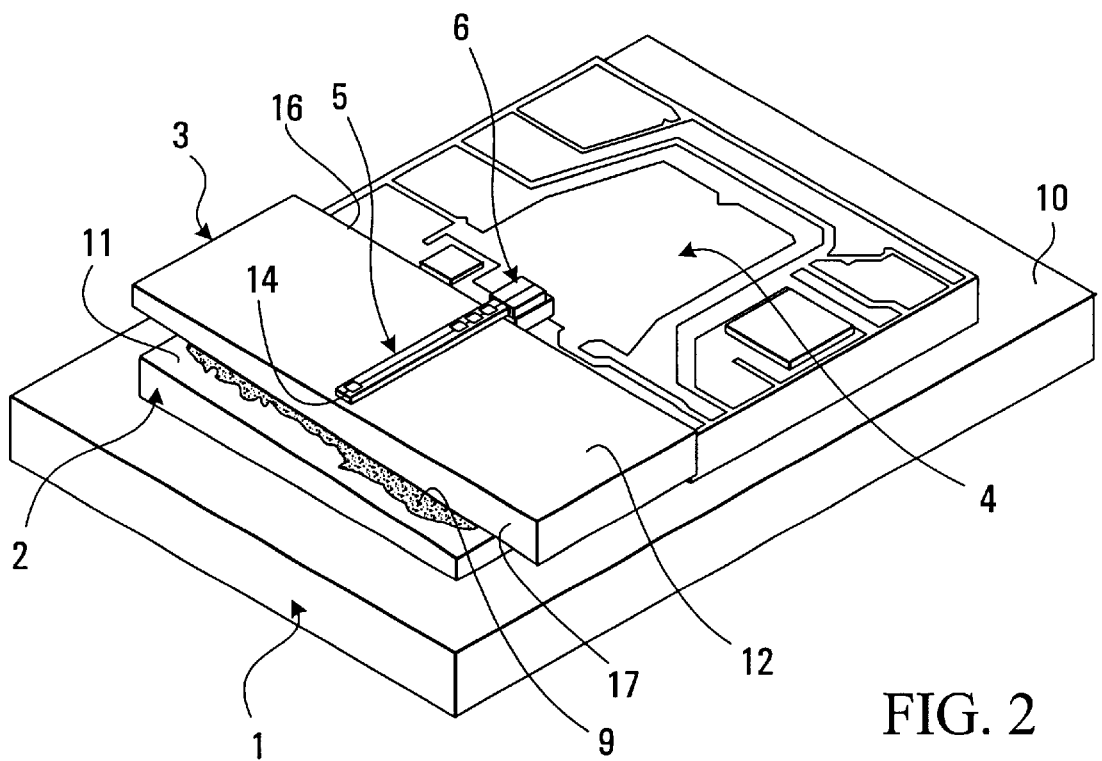
FIG. 2 is an isometric view of an aligned optical assembly implementation using the components of FIG. 1.

The MZ modulator 5, the shape of which is more clearly seen in FIG. 2, is elongate and has an input face 13 at one longitudinal end and an output face 14 at the other longitudinal end. The modulator 5 is mounted (also by due bonding as for the laser diode except that there is no heat sink) on a rectangular upper surface 12 of the wedged carrier 3 such that the modulator longitudinal axis extends parallel to opposite vertical edges of the wedged carrier 3 at a location half-way along a third vertical edge 16 of the carrier 3 with the input face 13 of modulator 5 substantially parallel to but overhanging the edge 16 and the output face 14 proximate a vertical edge 17 of the carrier 3 which is parallel to edge 16.

The lower surface 18 of carrier 3 is also rectangular but is lapped to a small angle θ with respect to the upper surface, the angle θ preferably being in the range of 2 to 5°. It is noted that the modulator 5 is orientated such that it runs perpendicularly to the slope of the lower surface 17 with the input face 13 of the modulator being orthogonal to the angle θ.

The ceramic wedge 2 is of a size and shape similar to that of the wedged carrier 3. However, its upper surface 11 rather than its lower surface is lapped to the same angle θ as the lower surface 17 of the wedged carrier.

The flat baseplate 1 has flat parallel upper and lower surfaces and is sufficiently large to accommodate on the upper surface 10 thereof the wedge 2 and the flat carrier 4.

The mounting of components 1, 2, 3 and 4 together to provide an optical assembly in which the laser diode 6 is properly aligned with the modulator 5 will now be described with continued reference to FIG. 1 in conjunction with FIG. 2.

A thin layer 9 of liquid adhesive, which may be an ultraviolet (UV) cured or heat cured adhesive, is spread on the upper surface of baseplate 1 which is held securely. The carrier 4 is then positioned with its lower surface upon the liquid adhesive 9 proximate an end of the baseplate, preferably with the edges of carrier 4 running generally parallel to the edges of baseplate 1, and with the edge 15 with which the output face of laser diode 6 is flush being located approximately half-way along the baseplate 1. The wedge 2 is then positioned with its flat lower surface on the liquid adhesive such that one of the longer vertical edges of the wedge engages the edge 15 of carrier 4 in which position the slope of the upper surface 11 of the wedge is orthogonal to the output face 8 of the laser diode 6.

Some more liquid adhesive is spread on the upper surface 11 of the wedge 2 and the wedged carrier 3 is positioned on top of wedge 2 with their slope axes aligned and the angled lower surface of carrier 3 against the angled upper surface of wedge 2 but with the inclines being oriented 180° with respect to each other i.e. whereas the wedge 2 can be seen to narrow in the direction left to right in FIG. 2 the carrier 3 can be seen to narrow from right to left. This orientation ensures that no matter how far the wedge and wedged carrier are moved along their inclines relative to each other the upper surface 12 of the wedged carrier 3, and therefore the input face 13 of the modulator 5, remains parallel to the upper surface 10 of the baseplate. With the wedged carrier thus positioned on wedge 2 the output face 18 of the laser diode 6 and the input face 13 will be located on virtually the same plane and generally proximate each other.

The uncured liquid adhesive 9 acts as a lubricant allowing easy sliding of the wedge 2 and respective carriers 3,4 for subsequent device alignment. For example, by sliding the wedge 2 and wedged carrier 3 relative to one another such that the wedged carrier 3 slides up or down the incline of the wedge 2, vertical adjustment of the external modulator 5 is made relatively simple. Similarly, the uncured liquid adhesive also affords easy manipulation (sliding) of the wedge 2 relative to the flat ceramic carrier 4 upon the baseplate 1, thereby enabling horizontal and lateral alignment. Either the carrier 4 or wedge 2 or both can be moved. It is obvious, then, that the resulting assembly allows for the precise alignment of semiconductor optical devices with four degrees of freedom: x, y, z axis and yaw.

Inserted of applying the wedge 2 to the incurred adhesive and then applying additional adhesive on its upper surface as described above in an alternative embodiment the wedge 2 would be pre-glued to the upper surface of the baseplate as a first step. Then, the layer 9 of liquid adhesive would be applied to the remaining surface of the baseplate and the carrier 4 positioned on the adhesive next to the wedge.

The small nature of the various components necessitates the use of some sort of alignment station to help manipulate the optical assembly. This alignment station may include, for example, a stereo microscope together with some sort of 'jig' comprised of a laser carrier manipulator block, an MZ carrier manipulator block and a baseplate manipulator block. The manipulator blocks would include means to grip the various parts and to allow for their relative movement.

Using the jig or alignment station, it is possible to align the laser and modulator to sub-micron tolerances. The devices are align-butted (with a sub-micron gap) allowing physical features (e.g. waveguide ridges) to be visually aligned very quickly. Once the devices are visually aligned, there is sufficient light coupled to do 'active' alignment i.e. detecting proper alignment on the bases of the optical coupling between the two devices. Once the desired alignment has been achieved, the devices can be simply fixed by exposing the assembly to ultraviolet (UV) light or heat, depending on the adhesive used.

The sliding action used to achieve alignment serves the additional role of spreading the adhesive and expelling the excess, resulting in a very thin glue layer. This reduces any shifts due to adhesive shrink upon curing. In addition, pitch and roll are fixed by the mating surfaces of the ceramic carriers. The flatness and parallelism of these can be maintained to a high degree of accuracy using industry standard processes. The large bond areas also withstand large shear forces without disturbing the alignment.

By no means is the invention limited to the alignment of lasers with external modulators. That is, the invention may be applied to the alignment of various other semiconductor optical components or indeed any two devices. In general, the present invention provides a simple and cost-effective means to align semiconductor optical devices to one another and fix them in place. The dual-wedge design permits vertical alignment with both devices fully supported by the ceramic carriers upon the common baseplate. As mentioned, the gluelines are extremely thin and do not create movement (misalignment) with curing. The completed assembly features both devices supported by the same height of ceramic above the baseplate, enabling the alignment to remain intact with thermal excursions.

Alignment of semiconductor optical devices according to the invention affords a shorter training period for operators. This is an advantage since the steep operator learning curve of previous alignment methods can be abandoned enabling less experienced and lower skill level operators to be employed. Most significantly, the invention provides a 90 per cent reduction in alignment time, thereby resulting in a higher volume throughput per station.

Advantageously, the invention eliminates the complex, labour intensive, low-yield alignment process currently employed for semiconductor optical components, as well as the need for expensive optical components. Eliminating the optics (optical isolator and lenses) presently used to couple light from the laser to the input of an external modulator, for example, will make volume manufacture more manageable and cheaper. The invention also has the added advantage of requiring a lower capital value alignment station thus requiring a lower capital investment. In addition, the hybrid integration approach of the invention requires no significant investment in device development since the various required components already exist.

Figure 3:
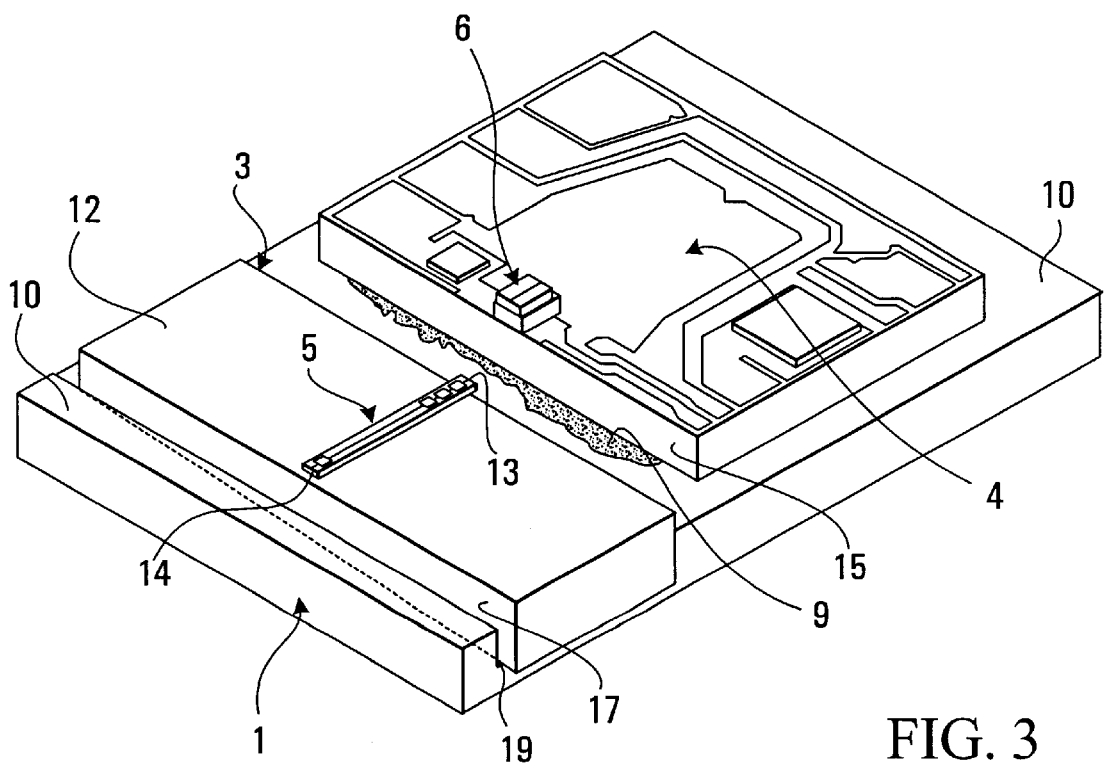
FIG. 3 is an isometric view of an optical alignment assembly according to another embodiment.

Finally, the wedge 2 need not be a separate independent structure but may be incorporated directly into the structure of the baseplate. That is, an inclined surface in the form of a sloped groove 19 can be machined into the upper surface 10 of the baseplate 1 as depicted in FIG. 3 and the wedged carrier 3 can then be placed in the groove 19 and slid up and down the incline to provide for vertical adjustment of its mounted device 5. Similarly, as shown in the isometric view of FIG. 4, the wedge may also take the form of a raised incline 20 protruding from the upper surface 10 of the baseplate 1. The embodiments illustrated in FIGS. 3 and 4 are preferred over the embodiment in which a separate wedge is used.

Figure 4:
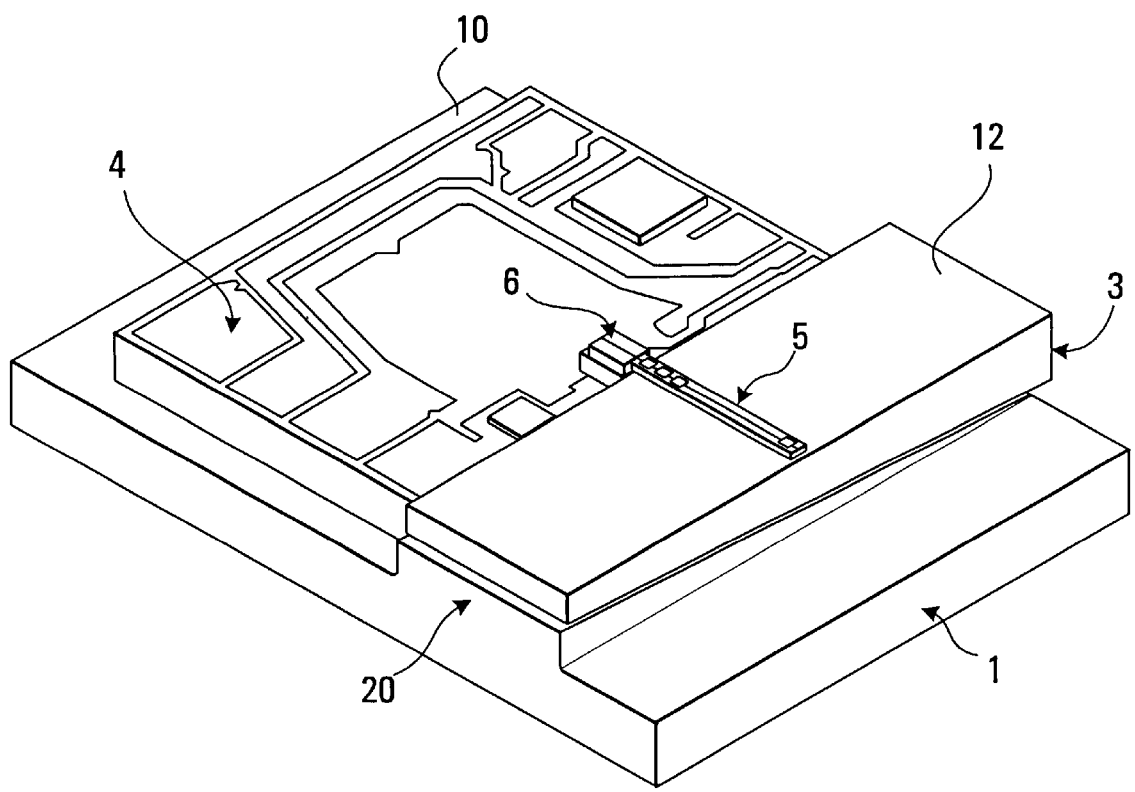
FIG. 4 is an isometric view of an optical alignment assembly according to yet another embodiment.

In the embodiments of FIGS. 3 and 4 the carrier 4 must be moved on the baseplate 1, to achieve the movement relative to the wedge.

While preferred embodiments of the invention have been described and illustrated, it will be apparent to one skilled in the art that numerous modifications, variations and adaptations may be made without departing from the scope of the invention as defined in the claims appended hereto.

For example, although the carrier 3 which rides on the inclined surface of the wedge (be it a separate wedge or an integral wedge) is described as wedge-shaped, in fact carrier 3 can be a simple flat carrier like carrier 4. It should be understood that with the use of a flat carrier 3 the coupling faces of the laser diode 6 and the MZ modulator could not be completely squarely aligned because of the angle of the included surface of wedge 2. For small angles such as the 2 to 5° suggested this does not present a practical problem.

Additionally, although the preferred embodiment uses liquid adhesive to permit easy sliding of the components relative to one another it is conceivable that the adhesive could be omitted. In such a case, the surfaces of the various components could be machined smooth or the components could be made of material which has a low coefficient of friction. After the components have been manipulated into the aligned position clamps, glue or other securing means could then be applied to hold the various components in the aligned position.

Furthermore, although preferably the coupling face of one of the original devices overhangs an edge of the respective carrier while the coupling face of the other optical device is substantially flush with the edge of its respective carrier, both faces could be located slightly inwardly of the respective edges or both faces could overhang slightly, i.e., each face need only be adjacent the respective edge rather than actually flush with it.

Finally although the carriers and baseplate are described as ceramic it is conceivable that other materials with similar properties could be used.

What is claimed is:

1. A method of mounting two devices together such that a face of a first one of the devices is aligned with a face of a second one of the devices, the method comprising:

mounting the first device on a first flat carrier with the face of the first device adjacent an edge of the first carrier;

mounting the second device on a second carrier with the face of the second device adjacent an edge of the second carrier;

providing a separate wedge having a flat lower surface and an upper surface inclined at an angle with respect to the flat lower surface;

providing a baseplate having a flat upper surface;

positioning the second carrier on the inclined surface of the wedge;

sliding the first carrier relative to the wedge on the baseplate and sliding the second carrier up or down the inclined surface of the wedge to bring the faces of the two devices into alignment; and securing the first carrier and wedge to the baseplate and the second carrier to the wedge in the aligned positions.

2. A method according to claim 1 further comprising applying liquid adhesive to the upper surface of the baseplate and the upper surface of the wedge to assist in the relative sliding and wherein the securing step is achieved by curing the liquid adhesive.

3. A method according to claim 2 wherein the liquid adhesive is a UV cured adhesive.

4. A method according to claim 2 wherein the liquid adhesive is a heat cured adhesive.

5. A method according to claim 1 wherein the two devices are electro-optical devices.

6. A method according to claim 5 wherein the step of bringing the faces of the two devices into alignment comprises firstly determining alignment visually and then determining alignment by causing light to be coupled between the two faces.

7. A method according to claim 1 wherein the step of sliding the first carrier relative to the wedge comprises engaging an edge of the wedge which runs parallel to the incline of the wedge with the edge of the first carrier with which the face of the first device is adjacent and sliding the first carrier relative to the wedge such that the two edges slide relative to each other.

8. A method according to claim 1 wherein the angle of inclination of the upper surface of the wedge is in the range 2–5°.

9. A method according to claim 1 wherein the baseplate, the first carrier, the second carrier and the wedge are all made of a ceramic material.

10. A method according to claim 1 wherein the second carrier is a flat carrier.

11. A method according to claim 1 wherein the second carrier is a wedge-shaped carrier having a lower surface inclined by the same amount but in an opposite sense from the inclined surface of the wedge.

12. A method of mounting two devices together such that a face of a first one of the devices is aligned with a face of a second one of the devices, the method comprising:

mounting the first device on a first, flat carrier with the face of the first device adjacent an edge of the first carrier;

mounting the second device on a second carrier with the face of the second device adjacent an edge of the second carrier;

providing a baseplate having an upper surface having a flat portion and an inclined portion, the inclined portion being inclined at an angle with respect to the flat portion;

positioning the first carrier on the flat portion of the baseplate;

positioning the second carrier on the inclined portion of the baseplate;

sliding the first carrier on the flat portion relative to the inclined portion and sliding the second carrier on the inclined portion in a direction along the incline to bring the faces of the two devices into alignment; and securing the first carrier and second carrier to the baseplate in the aligned positions.

13. A method according to claim 12 further comprising applying liquid adhesive to the upper surface of the baseplate to assist in the relative sliding and wherein the securing step is achieved by curing the adhesive.

14. A method according to claim 13 wherein the liquid adhesive is a UV cured adhesive.

15. A method according to claim 13 wherein the liquid adhesive is a heat cured adhesive.

16. A method according to claim 12 wherein the two devices are electro-optical devices.

17. A method according to claim 16 wherein the step of bringing the faces of the two devices into alignment comprises firstly determining alignment visually and then determining alignment by causing light to be coupled between the two faces.

18. A method according to claim 12 wherein the angle of inclination of the inclined portion of the baseplate with respect to the flat portion is in the range of 2–5°.

19. A method according to claim 12 wherein the baseplate, the first carrier and the second carrier are all made of a ceramic material.

20. A method according to claim 12 wherein the second carrier is a flat carrier.

21. A method according to claim 12 wherein the second carrier is a wedge-shaped carrier having a lower surface inclined by the same amount but in an opposite sense from the inclined portion of the baseplate.

* * * * *